United States Patent [19]

Primeaux, II

[11] Patent Number: 5,266,671
[45] Date of Patent: * Nov. 30, 1993

[54] SPRAY POLYUREA ELASTOMERS WITH ABRASION RESISTANCE

[75] Inventor: Dudley J. Primeaux, II, Elgin, Tex.

[73] Assignee: Texaco Chemical Co., White Plains, N.Y.

[*] Notice: The portion of the term of this patent subsequent to Jun. 8, 2010 has been disclaimed.

[21] Appl. No.: 412,027

[22] Filed: Sep. 25, 1989

[51] Int. Cl.$^5$ ............................................. C08G 18/30
[52] U.S. Cl. .................................... 528/68; 528/49; 528/55; 528/56; 528/57; 528/60; 528/61; 528/64; 528/76; 528/77; 528/85
[58] Field of Search .................. 528/79, 77, 55, 56, 528/57, 58, 61, 68, 49, 122, 75, 85, 48, 76

[56] References Cited

U.S. PATENT DOCUMENTS

| | | | |
|---|---|---|---|
| 3,714,128 | 1/1973 | Rowton et al. | 528/61 |
| 3,979,364 | 9/1976 | Rowton et al. | 528/49 |
| 4,607,090 | 8/1986 | Dominguez | 528/48 |
| 4,695,618 | 9/1987 | Mowrer | 528/77 |
| 4,732,919 | 3/1988 | Grigsby, Jr. et al. | 528/77 |
| 4,870,150 | 9/1989 | Bandlish et al. | 528/45 |

*Primary Examiner*—John Kight, III
*Assistant Examiner*—Duc Truong
*Attorney, Agent, or Firm*—James J. O'Loughlin; Dominick G. Vicari

[57] ABSTRACT

A spray polyurea elastomer which exhibits improved resistance to abrasion is disclosed. The elastomer includes an isocyanate, an amine terminated polyoxyalkylene polyol, a chain extender and a chemically sized filler material. The isocyanate is preferably a quasi-prepolymer of an isoyanate and a material selected from at least one polyol, a high molecular weight polyoxyalkyleneamine or a combination thereof. A method for making a spray polyurea elastomer which is substantially resistant to abrasion is also disclosed.

27 Claims, No Drawings

SPRAY POLYUREA ELASTOMERS WITH ABRASION RESISTANCE

BACKGROUND OF THE INVENTION

1. Field of the Invention

The present invention relates generally to spray polyurea elastomers and, more specifically, to spray polyurea elastomers which include chemically sized mineral particles, thereby improving the abrasion resistance of the cured elastomer.

2. Description of Background Art

Elastomer systems are commonly recognized as, among other things, coating materials, with spray polyurea elastomer systems being particularly useful when employed in this capacity. One of the considerations confronting the skilled artisan is the abrasion resistance of the coating after it is ultimately applied to a substrate. In accordance with the present invention the abrasion resistance of a spray polyurea elastomer is improved by incorporating chemically sized mineral particles in the system as is discussed with particularity hereinbelow.

U.S. Pat. No. 4,585,850 describes a reaction injection molded (RIM) elastomer made by reacting, in a closed mold, an amine terminated polyether of greater than 1500 average molecular weight, having greater than 50% of their active hydrogens in the form of amine hydrogens; a chain extender; flaked glass pretreated with an amino silane coupling agent; and an aromatic polyisocyanate. The '850 patent referred to above contains a discussion of other applications and patents in the field; for example, U.S. Pat. Nos. 4,474,900 and 4,507,090, and is incorporated herein by reference. Similarly, U.S. Pat. No. 4,716,193 describes a reactive glass component employed in a reinforced reaction injection molded elastomer. However, since these patents relate to RIM elastomers, patentees are not concerned with abrasion resistance. Specifically, RIM articles are invariably formed in a closed mold and, accordingly, the elastomeric material used to form the molded article becomes pressurized within the mold as additional amounts of elastomer are introduced therein. As a result, the density of the thus formed article is greater at the locus of the surface or skin, relative to the density at the locus of the core. The increased surface density of a RIM article provides a characteristic resistance to abrasion. This phenomenon is not exhibited by spray polyurea coatings, inasmuch as the coating is sprayed onto a substrate, i.e., an open mold, and, accordingly, the pressure required to provide the increased surface density is unavailable.

Furthermore, since the article formed via RIM typically has a topcoat, the degree to which the RIM article exhibits resistance to abrasion is even further enhanced.

U.S. Pat. No. 3,979,364 describes the use of aminated polyethers as hereinafter used as a component with a polyol to make an elastomer. U.S. Pat. No. 3,666,788 describes the use of cyanoalkylated aminated polyethers in spray systems. The '788 disclosure, in Column states that the aminated polyethers as used hereinafter cannot be used in spray coatings due to very rapid reaction rates with isocyanates.

U.S. Pat. Nos. 4,379,729; 4,444,910 and 4,433,067 describe elastomers which are prepared using a high molecular weight amine terminated polyether, an aromatic diamine chain extender and an aromatic polyisocyanate which may merely be a polyisocyanate or a quasi-prepolymer prepared from a polyol reacted with a polyisocyanate wherein some isocyanate groups are still left unreacted. Various patents have been applied for and received using the basic combination recited above as well as various mold release agents and other additives, such as catalysts and fillers, including glass fibers. For example, see U.S. Pat. No. 4,607,090.

Polyoxyalkylene polyamines, particularly JEFFAMINE ® T-403, D-400 and D-230, are described as chain extenders in U.S. Pat. No. 4,732,919; however, this patent relates to an elastomer system to be used in a RIM application.

The publication "Silane Effects and Machine Processing in reinforced High Modulus RIM urethane Composites," by E. G. Schwartz, et al., *Journal of Elastomers and Plastics*, vol. 11 (October, 1979), page 280, describes the use of silane treated milled glass fibers in reinforced RIM composites.

The publication "Surface Modification for RRIM Urethanes," by Ed Galli, *Plastics Compounding* (Jan/Feb 1982) describes silane treated glass fiber reinforcement of RRIM urethanes.

Commonly assigned U.S. patent application Ser. No. 261,193 describes spray polyurea elastomers which include roved filler materials that are externally added. A method for making those elastomers is also described.

Therefore, it is my understanding that a spray polyurea elastomer system which includes chemically sized filler materials incorporated directly in the elastomer and which exhibits favorable resistance to abrasion, especially when employed as a coating, has heretofore been unavailable.

SUMMARY OF INVENTION

Accordingly, the present invention relates to a spray polyurea elastomer which comprises an (A) component and a (B) component. The (A) component includes an isocyanate. Preferably, the isocyanate of component (A) includes a quasi-prepolymer of an isocyanate and a material selected from at least one polyol, a high molecular weight polyoxyalkyleneamine or a combination of these materials. The (B) component includes (1) an amine terminated polyoxyalkylene polyol, (2) a chain extender and (3) a chemically sized filler material employed in an amount sufficient to make the elastomer substantially resistant to abrasion.

The present invention also relates to a method for making a spray polyurea elastomer coating which is substantially resistant to abrasion. Specifically, the method of this invention comprises directing a first and second reactive stream into mutual contact with each other to effectuate a mixing of the first and second reactive streams. The first reactive stream includes an isocyanate and the second reactive stream includes an amine terminated polyoxyalkylene polyol, a chain extender and a chemically sized filler material. The mixed first and second reactive streams are delivered onto a substrate in a manner such that the substrate becomes coated with the mixed first and second reactive streams. The mixture of the first and second reactive streams is then permitted to cure on the substrate to form the spray polyurea elastomer coating. The chemically sized filler material is employed in the elastomer in an amount sufficient to make the elastomer coating substantially resistant to abrasion.

Advantageously, in addition to exhibiting substantial resistance to abrasion, the polyurea spray elastomer of the present invention exhibits other favorable characteristics, such as good thermal stability, tear resistance and flexural modulus. Also, the processing characteristics of the elastomer, such as speed and flexibility, are improved.

Generally, the present method involves spraying onto a substrate; specific substrates include, but are not limited to, open molds to manufacture, among other things, bathtubs, shower stalls, automotive parts, boat hulls and in other applications where fiberglass resins, epoxies and polyesters are typically being used.

DESCRIPTION OF THE PREFERRED EMBODIMENTS

The isocyanates employed in component (A) are those known to one skilled in the art. Thus, for instance, they can include aliphatic isocyanates of the type described in U.S. Pat. No. 4,748,192. Accordingly, they are typically aliphatic diisocyanates, and, more particularly, are the trimerized or the biuretic form of an aliphatic diisocyanate, such as hexamethylene diisocyanate, or the bifunctional monomer of the tetraalkyl xylene diisocyanate, such as the tetramethyl xylene diisocyanate. Cyclohexane diisocyanate is also to be considered a preferred aliphatic isocyanate. Other useful aliphatic polyisocyanates are described in U.S. Pat. No. 4,705,814. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as 1,3 and 1,4-cyclohexane diisocyanate as well as any desired mixture of these isomers, 1-isocyanato-3,3,5-trimethyl-5-isocyanatomethyl-cyclohexane (isophorone diisocyanate); 4,4'-,2,2'- and 2,4'-dicyclohexylmethane diisocyanate as well as the corresponding isomer mixtures, and the like.

A wide variety of aromatic polyisocyanates may be used to form the elastomer of the present invention. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyanatophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methlene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent diphenyldiisocyanate isomers, of which 20 to about 95 weight percent thereof is the 4,4'-isomer with the remainder being polymethylene polyphenyl polisocyanates of higher molecular weight and funtionality that have an average functionality of from about 2.1 to about 3.5. These isocyanate mixtures are known, commercially available materials and can be prepared by the process described in U.S. Pat. No. 3,362,979.

By far the most preferred aromatic polyisocyanate is methylene bis(4-phenylisocyanate) or MDI. Pure MDI, quasi-prepolymers of MDI, modified pure MDI, etc. are useful. Materials of this type may be used to prepare suitable RIM elastomers. Since pure MDI is a solid and, thus, often inconvenient to use, liquid products based on MDI or methylene bis(4-phenylisocyanate) are used herein. U.S. Pat. No. 3,394,164 describes a liquid MDI product. More generally, uretonimine modified pure MDI is included also. This product is made by heating pure distilled MDI in the presence of a catalyst. The liquid product is a mixture of pure MDI and modified MDI and is represented as follows:

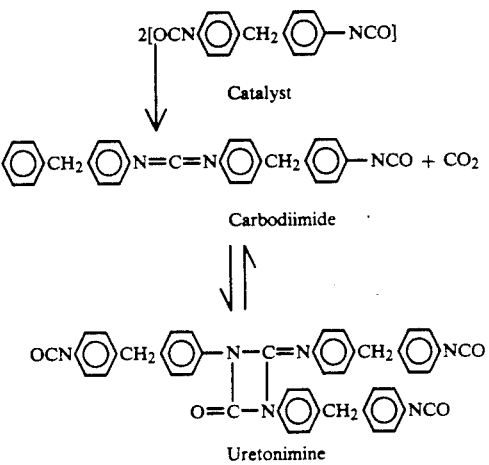

Examples of commercial materials of this type are Dow's ISONATE® 125M (pure MDI) and ISONATE 143L ("liquid" MDI). Preferably the amount of isocyanates used is the stoichiometric amount based on all the ingredients in the formulation or greater than the stoichiometric amount.

Of course, the term isocyanate also includes quasi-prepolymers of isocyanates or polyisocyanates with active hydrogen containing materials. The active hydrogen containing materials can include, but are not limited to, a polyol or polyols, a high molecular weight polyoxyalkyleneamine or combinations thereof.

The polyols include polyether polyols, polyester diols, triols, tetrols, etc., having an equivalent weight of at least about 500, and preferably at least about 1,000 up to about 3,000. Those polyether polyols based on trihydric initiators of about 4,000 molecular weight and above are especially preferred. The polyethers may be prepared from ethylene oxide, propylene oxide, butylene oxide or mixtures of propylene oxide, butylene oxide and/or ethylene oxide. Other high molecular weight polyols which may be useful in this invention are polyesters of hydroxyl terminated rubbers, e.g., hydroxyl terminated polybutadiene. Hydroxyl terminated quasi-prepolymers of polyols and isocyanates are also useful in this invention.

Especially preferred are amine terminated polyether polyols, including primary and secondary amine terminated polyether polyols of greater than 1,500 average molecular weight having from about 2 to about 6 functionality, preferably from about 2 to about 3, and an amine equivalent weight of from about 750 to about 4,000. Mixtures of amine terminated polyethers may be used. In a preferred embodiment the amine terminated polyethers have an average molecular weight of at least about 2,500. These materials may be made by various methods known in the art.

The amine terminated polyether resins useful in this invention, for example, are polyether resins made from an appropriate initiator to which lower alkylene oxides, such as ethylene oxide, propylene oxide, butylene oxide or mixtures thereof, are added with the resulting hydroxyl terminated polyol then being aminated.

When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, in a preferred embodiment, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by known techniques, for example, as described in U.S. Pat. No. 3,654,370, the contents of which is incorporated herein by reference.

In the practice of this invention, a single high molecular weight amine terminated polyol may be used. Also, mixtures of high molecular weight amine terminated polyols, such as mixtures of di-and trifunctional materials and/or different molecular weight or different chemical composition materials, may be used.

Also, high molecular weight amine terminated polyethers or simply polyether amines are included within the scope of my invention and may be used alone or in combination with the aforestated polyols. The term high molecular weight is intended to include polyether amines having a molecular weight of at least about 2000. Particularly preferred are the JEFFAMINE ® series of polyether amines available from Texaco Chemical Company; they include JEFFAMINE D-2000, JEFFAMINE D-4000, JEFFAMINE T-3000 and JEFFAMINE T-5000. These polyether amines are described with particularity in Texaco Chemical Company's product brochure entitled THE JEFFAMINE POLYOXYALKYLENEAMINES.

The (B) component of the present spray polyurea elastomer system includes an amine terminated polyoxyalkylene polyol and a chain extender. The amine terminated polyoxyalkylene polyol is preferably selected from diols or triols and, most preferably, includes a blend of diols and/or triols. The particular polyols, i.e., diols and/or triols, employed in component (B) are the same as those described hereinabove in connection with the quasi-prepolymer of component (A).

The chain extenders useful in this invention include, for example, 1-methyl-3,5-diethyl-2,4-diaminobenzene, 1-methyl-3,5 diethyl-2,6-diaminobenzene (both of these materials are also called diethyltoluene diamine or DETDA), 1,3,5-triethyl-2,6-diaminobenzene, 3,5,3',5'-tetraethyl-4,4'-diaminodiphenylmethane and the like. Particularly preferred aromatic diamine chain extenders are 1-methyl-3,5-diethyl-2,4-diaminobenzene or a mixture of this compound with 1-methyl-3,5-diethyl-2,6-diaminobenzene. It is within the scope of this invention to include some aliphatic chain extender materials as described in U.S. Pat. Nos. 4,246,363 and 4,269,945.

Other chain extenders included amine terminated chain extenders which are generally described as low molecular weight polyoxyalkylene polyamines containing terminal amine groups. One particular chain extender is represented by the formula:

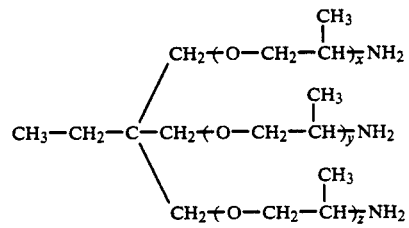

wherein x+y+z has a value of about 5.3. The average amine hydrogen equivalent weight is about 67 and the product is commercially available from Texaco Chemical Company as JEFFAMINE T-403.

Another related polyoxypropylene chain extender is represented by the formula:

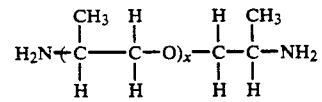

wherein x has a value of about 5.6. This product has an average amine hydrogen equivalent weight of about 100 and is commercially available from Texaco Chemical Company as JEFFAMINE D-400. The product having the same formula as above wherein x has an average value of about 2.6 is useful. This product has an average amine hydrogen equivalent weight of about 57.5 and is commercially available from Texaco Chemical Company as JEFFAMINE D-230.

Other chain extenders will be apparent to those skilled in the art and the above recitation is not intended to be a limitation on the invention claimed herein.

The chemically sized filler materials can be employed in component (A) or (B), preferably they are employed in component (B). These materials are preferably mineral particles, such as calcium metasilicate, milled glass, flaked glass, mica and glass spheres, which have been chemically sized by being subjected to treatment with a sizing agent, such as amino silanes and epoxy silanes The sizing agent can also be selected from amine terminated titanate and zirconate coupling agents, which are available from Kenrich Petrochemicals Inc., Bayonne, N.J. The sizing agent functions to provide a chemical bond between the spray polyurea elastomer and the filler materials. One particularly preferred mineral particle is WOLLASTOKUP ® 10012, an amino silane treated Wollastonite, available from NYCO, a division of Canadian Pacific (U.S.) Inc.

The chemically sized filler particles are generally employed in an amount of about greater than 0 to about 25 weight percent of the overall elastomer. Preferably, the filler particles are employed in an amount of about 5 to about 20 weight percent.

Since the present invention relates to a spray polyurea elastomer, the particle size of the filler is a significant aspect. Generally, the filler materials must be small enough so that they are permitted to pass through the orifice of the spray apparatus. Therefore, filler particles used in RIM applications are typically not well suited for use in the instant invention. The size of the filler particles used herein can range from about 1/256 inch to about 1/32 inch, with the preferred size ranging from about 1/128 inch to about 1/64 inch.

Optionally, the present spray polyurea elastomer can include an internal mold release agent to facilitate the removal of the cured elastomer from the open mold. While the release agent, if employed, can be incorporated into the (A) or (B) component, it is preferably incorporated in the (B) component. The internal mold release agents useful in the present invention are known to those skilled in the art; they include, but are not limited to, zinc stearate, sodium oleate and silicone agents.

Advantageously, the (A) and (B) components react to form the present elastomer system without the aid of a catalyst. However, if desired, a catalyst can be used.

Catalysts such as tertiary amines or an organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., trimethylamine, triethylamine); heterocyclic amines, such as N-alkymorpholines (e.g., N-methylmorpholine, N-ethylmorpholine, dimethyldiaminodiethylether, etc.), 1,4-dimethylpiperazine, triethylenediamine, etc.; and aliphatic polyamines, such as N,N,N'N'-tetramethyl-1,3-butanediamine.

Other conventional fomulation ingredients may be employed in component (A) or (B) as needed, such as, for example, foam stabilizers, also known as silicone oils or emulsifiers. The foam stabilizers may be an organic silane or siloxane. For example, compounds may be used having the formula:

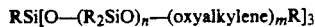

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Pigments, for example titanium dioxide, may be incorporated in the elastomer system, preferably in the (B) component, to impart color properties to the elastomer.

Post curing of the elastomer of the invention is optional Post curing will improve some elastomeric properties, such as heat sag. Employment of post curing depends on the desired properties of the end product.

The (A) component and (B) component of the present spray polyurea elastomer system are combined or mixed under high pressure; most preferably, they are impingement mixed directly in the high pressure spray equipment, which is, for example, a GUSMER® H-V proportioner fitted with a GUSMER Model GX-7 spray gun. In particular, a first and second pressurized stream of components (A) and (B), respectively, are delivered from two separate chambers of the proportioner and are impacted or impinged upon each other at high velocity to effectuate an intimate mixing of the two components and, thus, the formation of the elastomer system, which is then coated onto the desired substrate via the spray gun.

In a preferred embodiment, the mixing module of the GUSMER GX-7 spray gun is modified by installing carbide mixing chambers to avoid the potential for the deterioration of the plastic chamber by the sized filler particles.

The volumetric ratio of the (A) component to the (B) component is generally from about 30 to 70 percent to about 70 to 30 percent. Preferably, component (A) and component (B) are employed in a 1:1 volumetric ratio.

GLOSSARY OF TERMS AND MATERIALS

TEXOX® PPG-2000—Polypropylene oxide of about 2000 molecular weight; a product of Texaco Chemical Company ISONATE® 143 L—Carbodiimide modified liquid MDI; a product of the Upjohn Company.

THANOL® SF-5505—A 5500 molecular weight polyether triol containing approximately 80% primary hydroxide groups.

FOMREZ® EPD-28—Polypropylene oxide block, ethylene oxide capped polyol of about 4000 molecular weight; a product of WITCO Corp.

JEFFAMINE® T-5000—Polypropylene oxide triamine of about 5000 molecular weight; a product of Texaco Chemical Company.

JEFFAMINE® T-3000—Polypropylene oxide triamine of about 3000 molecular weight; a product of Texaco Chemical Company.

JEFFAMINE® D-4000—Polypropylene oxide diamine of about 4000 molecular weight; a product of Texaco Chemical Company.

JEFFAMINE® D-2000—Polypropylene oxide diamine of about 2000 molecular weight; a product of Texaco Chemical Company.

JEFFAMINE® T-403, D-400 and D-230 are described with particularity hereinabove.

The following examples are provided to further illustrate preferred embodiments of the present invention and should not be construed as limiting the present invention in any way.

In the examples, all spray work was performed with a GUSMER H-V high pressure proportioner with a model GX-7 spray gun. The elastomer systems were sprayed using a block temperature of 160° F. on the (A) component side and 150° F. on the (B) component side, with a hose temperature of 160.F. The system output ranged from 17.5 lbs/min to 22.5 lbs/min with a line pressure ranging from 2500 to 3000 psig on the (A) component side and 2000 to 2500 psig on the (B) component side. Each of the elastomer systems produced in the examples were mixed at an (A):(B) volumetric ratio of 1:1. The (B) component containing the filler material did not require agitation as it would have in RIM mixing equipment.

EXAMPLE I

The (A) component of a spray polyurea elastomer was prepared by combining 60 parts of ISONATE 143L and 40 parts of THANOL SF-5505 to form a quasi-prepolymer. The (B) component was prepared by combining 27.07 parts of JEFFAMINE T-5000, 18.05 parts of JEFFAMINE D-4000, 12.41 parts of JEFFAMINE D-2000, 32.15 parts of DETDA and 10.32 parts of WOLLASTOKUP 10012. The (A) and (B) components were mixed in the high pressure spray equipment at an (A):(B) weight ratio of 1.066. The resulting reinforced polymer elastomer was sprayed onto a flat metal substrate coated with a zinc stearate based external mold release agent and exhibited a gel time of 1.8 seconds. As spraying proceeded, a change in the systems pressure was noted, which was ascribed to the deterioration of the mixing orifices on the (B) component side of the plastic mixing module by the sized mineral particles.

COMPARATIVE EXAMPLE I(A)

The (A) component of the spray polyurea elastomer produced in this example was prepared in accordance with Example I. The (B) component was prepared by combining 31.2 parts of JEFFAMINE T-5000, 20.8 parts of JEFFAMINE D-4000, 14.3 parts of JEFFAMINE D-2000 AND 33.7 parts of DETDA. The (A) and (B) components were mixed in the high pressure spray equipment at an (A):(B) weight ratio of 1.131. The polyurea elastomer produced in this example was sprayed in accordance with Example I.

The physical properties of the polyurea elastomers produced in Example I and Comparative Example I(A) were analyzed; the results are reported in Table I.

TABLE I

|  | Example I | Comparative Example I(A) |
|---|---|---|
| % glass | 4.61 | 0 |
| Tensile (psi) | 2058 | 2522 |
| Elongation (%) | 30 | 123 |
| Tear (pli) | 516 | 504 |
| Shore D hardness |  |  |
| (0 sec) | 57 | 62 |
| (10 sec) | 52 | 58 |
| Flexural modulus (psi) |  |  |
| 77° F. | 70705 | 48118 |
| 158° F. | 42942 | 42171 |
| −20° F. | 115088 | 110973 |
| Impact, notched (ft. lbs/in) | 3.44 | 9.15 |
| Heat sag (mm) |  |  |
| 100 mm - 250° F./60 min | 0 | 3.0 |
| 150 mm - 250° F./60 min | 4.0 | 15.0 |
| 100 mm - 311° F./60 min | 4.0 | — |
| 150 mm - 311° F./60 min | 18.5 | — |
| Abrasion resistance (1000 gm, 1000 rev, H-18 wheels wt loss in mg) | 280 | 550 |

As these data demonstrate, the spray polyurea elastomer of the present invention, which includes the chemically sized filler materials (Example I), exhibits an abrasion resistance that is nearly 100% better than an elastomer that is devoid of the chemically sized particles (Comparative Example I(A)). These data further establish other improved properties of the elastomer of Example I relative to those exhibited by the elastomer of Comparative Example I(A), such properties include tear resistance, flexural modulus and high temperature properties.

EXAMPLE II

The (A) component of a spray polyurea elastomer was prepared by combining 50 parts of ISONATE 143L and 50 parts of FOMREZ EPD-28. The (B) component was prepared by combining 39.7 parts of JEFFAMINE T-5000, 24.8 parts of JEFFAMINE D-2000, 23.8 parts of DETDA, 1.5 parts of zinc stearate and 10.2 parts of WOLLASTOKUP 10012. The (A) and (B) components were mixed in the high pressure spray equipment at an (A):(B) weight ratio of 1.031. The resulting reinforced polyurea elastomer was sprayed onto a flat metal substrate with no external mold release agent and exhibited a gel time of 2.0 seconds. The spray gun was modified to include carbide internal mixing components and, as a result, no pressure deviation was experienced.

COMPARATIVE EXAMPLE II (a)

The (A) component of the spray polyurea elastomer produced in this Example was prepared in accordance with Example II. The (B) component was prepared by combining 45.0 parts of JEFFAMINE T-5000, 28.2 parts of JEFFAMINE D-2000, 25.3 parts of DETDA and 1.5 parts of zinc stearate. The (A) and (B) components were mixed in the high pressure spray equipment at an (A):(B) weight ratio of 1.107. The resulting polyurea elastomer was sprayed onto the flat metal substrate as in Example II.

The physical properties of the polyurea elastomer produced Example II and Comparative Example II(A) were analyzed; the results are reported in Table II.

TABLE II

|  | Example 2 | Comparative Example No. II(A) |
|---|---|---|
| % glass | 4.76 | 0 |
| Tensile (psi) | 1895 | 1741 |
| Elongation (%) | 247 | 267 |
| Tear (pli) | 408 | 344 |
| Flexural modulus (psi) |  |  |
| 77° F. | 26583 | 19581 |
| 158° F. | 17912 | 13509 |
| −20° F. | 57273 | 44671 |
| Impact, notched (ft. lbs/in) | 7.42 | 4.24 |
| Heat sag (mm) |  |  |
| 100 mm - 250° F./60 min | 3.0 | 4.0 |
| 150 mm - 250° F./60 min | 17.5 | 28.0 |
| Abrasion resistance (1000 gm, 1000 rev, H-18 wheels wt loss in mg) | 290 | 520 |

As these data demonstrate, the spray polyurea elastomer of the present invention, which includes the chemically sized filler materials (Example II), exhibits an abrasion resistance that is nearly 90% better than an elastomer that is devoid of the chemically sized particles (Comparative Example II(A)). These data further establish other improved properties of the present elastomer, such as tear resistance, flexural modulus and high temperature properties.

What is claimed is:

1. A spray polyurea elastomer comprising an (A) component which includes an isocyanate and a (B) component which includes (1) an amine terminated polyoxyalkylene polyol, (2) a chain extender and (3) a chemically sized filler material employed in an amount sufficient to make said elastomer substantially resistant to abrasion.

2. The elastomer of claim 1 wherein said isocyanate of component (A) comprises a quasi-prepolymer of said isocyanate and a material selected from at least one polyol, a high molecular weight polyoxyalkyleneamine or a combination of said materials.

3. The elastomer of claim 2 wherein said at least one polyol of said quasi-prepolymer and said amine terminated polyoxyalkylene polyol of component (B) comprise polyether polyols or polyester polyols having an equivalent weight of at least about 500.

4. The elastomer of claim 3 wherein said polyester polyols are polyesters of hydroxyl terminated rubbers.

5. The elastomer of claim 3 wherein said polyether polyols are selected from the group consisting of polyols based on trihydric initiators having a molecular weight of at least about 4000; amine terminated polyether polyols having an average molecular weight greater than 1500, a functionality of from about 2 to about 6 and an amine equivalent weight of from about 750 to about 4000; and mixtures thereof.

6. The elastomer of claim 5 wherein the functionality of said polyether polyols is from about 2 to about 3.

7. The elastomer of claim 3 wherein said polyether polyols are derived from amine terminated polyether resins having greater than 50 percent of their active hydrogens in the form of amine hydrogens.

8. The elastomer of claim 3 wherein said amine terminated polyoxyalkylene polyol of component (B) is selected from diols, triols or blends thereof.

9. The elastomer of claim 1 wherein said chain extender is selected from a compound represented by the formula:

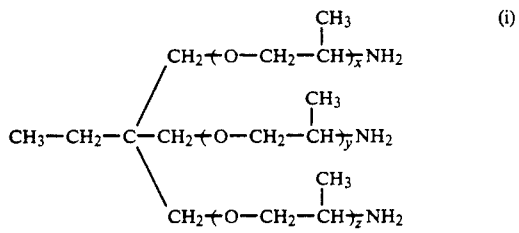

wherein x+y+z has a value of about 5.3 and wherein the average amine hydrogen equivalent weight is about 67;

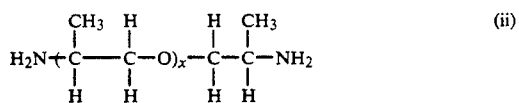

wherein x has a value of about 5.6 and wherein the average amine hydrogen equivalent weight is about 100;

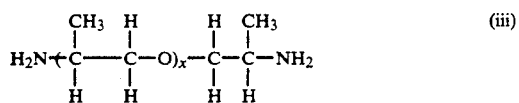

wherein x has a value of about 2.6 and wherein the average amine hydrogen equivalent weight is about 57.5; or (iv) a combination of at least two of compounds (i), (ii) and (iii).

10. The elastomer of claim 1 wherein said chain extender is selected from the group consisting of 1-methyl-3,5-diethyl-2,4-diaminobenzene; 1-methyl-3,5-diethyl-2,6-diaminobenzene; a mixture of 1-methyl-3,5-diethyl-2,4-diaminobenzene and 1-methyl-3,5 diethyl-2,6-diaminobenzene; 1,3,5-triethyl-2,6-diaminobenzene; and 3,5,3',5'-tetraethyl-4,4'-diaminodiphenylmethane.

11. The elastomer of claim 1 wherein said chemically sized filler material is selected from the group consisting of calcium metasilicate, milled glass, flaked glass, mica or glass spheres.

12. The elastomer of claim 1 wherein said filler material is chemically sized by being subjected to treatment with a sizing agent.

13. The elastomer of claim 12 wherein said sizing agent is selected from the group consisting of epoxy silanes, amino silanes and titanate or zirconate coupling agents.

14. The elastomer of claim 1 wherein said filler material is employed in said elastomer in an amount of about 5 to about 20 weight percent.

15. The elastomer of claim 1 wherein the size of the said filler material is from about 1/128 inch to about 1/64 inch.

16. The elastomer of claim 1 wherein the volumetric ratio of the (A) component to the (B) component is from about 30 to about 70 percent of the (A) component to about 70 to about 30 percent of the (B) component.

17. The elastomer of claim 1 further comprising an internal mold release agent.

18. A spray polyurea elastomer comprising an (A) component which includes a quasi-prepolymer of an isocyanate and a material selected from at least one polyol, a high molecular weight polyoxyalkyleneamine or a combination of said materials; and a (B) component which includes (1) an amine terminated polyoxalkylene polyol; (2) a chain extender selected from the group consisting of:

(i) 1-methyl-3,5-diethyl-2,4-diaminobenzene; (ii) 1-methyl-3,5 diethyl-2,6-diaminobenzene; (iii) a mixture of 1-methyl-3,5-diethyl-2,4-diaminobenzene and 1-methyl-3,5 diethyl-2,6-diaminobenzene;

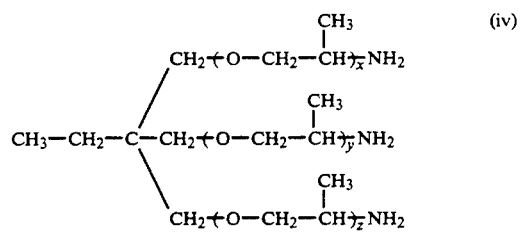

wherein x+y+z has a value of about 5.3 and wherein the average amine hydrogen equivalent weight is about 67;

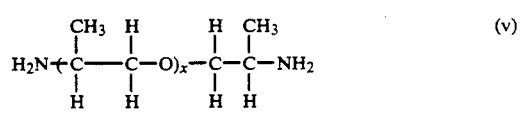

wherein x has a value of about 5.6 and wherein the average amine hydrogen equivalent weight is about 100;

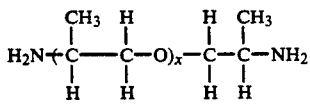 (vi)

wherein x has a value of about 2.6 and wherein the average amine hydrogen equivalent weight is about 57.5; or (vii) a combination of at least two of compounds (i)–(vi); and (3) a chemically sized filler material selected from the group consisting of calcium metasilicate, milled glass, flaked glass, mica or glass spheres, wherein said filler material is chemically sized by being subject to treatment with a sizing agent selected from epoxy silanes, amino silanes and titanate or zirconate coupling agents.

19. The elastomer of claim 18 wherein said filler material is employed in said elastomer in an amount of about 5 to about 20 weight percent.

20. The elastomer of claim 18 wherein the size of said filler material is from about 1/128 inch to about 1/64 inch.

21. A method for making a spray polyurea elastomer coating which is substantially resistant to abrasion, said method comprising (a) directing a first and second reactive stream into mutual contact with each other to effectuate a mixing of said first and second reactive streams, said first reactive stream including an isocyanate and said second reactive stream including an amine terminated polyoxyalkylene polyol, a chain extender and a chemically sized filler material; (b) delivering said mixed first and second reactive streams onto a substrate in a manner such that said substrate becomes coated with said mixed first and second reactive streams; and (c) permitting said mixed first and second reactive streams to cure on said substrate to form said spray polyurea elastomer coating, said chemically sized filler material being employed in an amount sufficient to make said elastomer coating substantially resistant to abrasion.

22. The method of claim 21 wherein said filler material is chemically sized by treating said filler material with an epoxy silane, amino silane and titanate or zirconate coupling agents.

23. The method of claim 21 wherein said chemically sized filler material is selected from the group consisting of calcium metasilicate, milled glass, flaked glass, mica or glass spheres.

24. The method of claim 21 wherein said filler material is employed in said elastomer in an amount of about 5 to about 20 weight percent.

25. The method of claim 21 wherein the size of the said filler material is from about 1/128 inch to about 1/64 inch.

26. The method of claim 21 wherein said chain extender is selected from a compound represented by the formula:

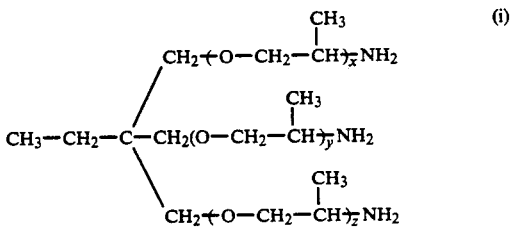 (i)

wherein x+y+z has a value of about 5.3 and wherein the average amine hydrogen equivalent weight is about 67;

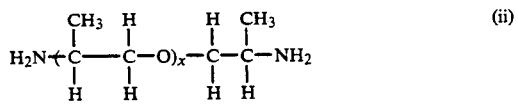 (ii)

wherein x has a value of about 5.6 and wherein the average amine hydrogen equivalent weight is about 100;

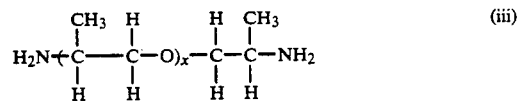 (iii)

wherein x has a value of about 2.6 and wherein the average aminehydrogen equivalent weight is about 57.5; or (iv) a combination of at least two of compounds (i), (ii) and (iii).

27. The method of claim 21 wherein said chain extender is selected from the group consisting of 1-methyl-3,5-diethyl-2,4-diaminobenzene; 1-methyl-3,5-diethyl-2,6-diaminobenzene; a mixture of 1-methyl-3,5-diethyl-2,4-diaminobenzene and 1-methyl-3,5 diethyl-2,6-diaminobenzene; 1,3,5-triethyl-2,6-diaminobenzene; and 3,5,3',5'-tetraethyl-4,4'-diaminodiphenylmethane.

* * * * *